DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 3, 1973

909 O.G. 6

T909,005

CONTINUOUS MANUFACTURE OF BREAD

Donald F. Meisner, Arlington Heights, and Raymond G. Robertson, Rolling Meadows, Ill., assignors to Kraftco Corporation, New York, N.Y.

Continuation of application Ser. No. 33,872, May 1, 1970. This application May 17, 1972, Ser. No. 254,329

Int. Cl. A21d *2/16*

U.S. Cl. 99—90 CB

No Drawing. 14 Pages Specification

Bread dough is continuously manufactured by a process wherein a yeast brew is provided in a first mixing chamber, a fat blend which may be substantially free of hard fat but which comprises a dough conditioning agent is prepared in a second mixing chamber. The fat blend and yeast brew are blended to provide a pre-mix. The pre-mix is then mixed with sufficient flour to provide a bread dough.